United States Patent [19]
Kilcher

[11] 3,794,390
[45] Feb. 26, 1974

[54] SLIDING AND DEFORMABLE BEARING FOR INSERTION BETWEEN BUILDING COMPONENTS

[76] Inventor: Fredy Kilcher, Wengisteinstrasse 9A 4500, Solothurn, Switzerland

[22] Filed: Nov. 9, 1971

[21] Appl. No.: 197,083

[30] Foreign Application Priority Data
Dec. 16, 1970   Switzerland.................. 18627/70

[52] U.S. Cl. ............................ 308/3 R, 248/1
[51] Int. Cl. ................................ F16c 17/00
[58] Field of Search.. 248/1, 102, 105; 52/396, 403; 14/16; 308/3 R, 2 R, 5 R; 152/346, 330; 150/2.1, 2.2

[56] References Cited
UNITED STATES PATENTS

| | | | |
|---|---|---|---|
| 1,933,441 | 10/1933 | Laursen | 150/2.1 |
| 2,120,013 | 6/1938 | Bates | 150/2.1 |
| 2,136,043 | 11/1938 | Delaney | 150/2.1 |
| 3,174,809 | 3/1965 | Mackie | 308/9 |
| 3,104,496 | 9/1963 | Macks | 308/9 |
| 3,663,027 | 5/1972 | Klipping | 308/3 A |
| 3,456,993 | 7/1969 | Muller | 308/9 |
| 2,134,746 | 11/1938 | Allen | 248/102 |
| 3,455,026 | 7/1969 | Clarvoe | 52/403 |
| 3,514,144 | 5/1970 | Alderfer | 152/330 |
| 3,633,855 | 1/1972 | Nell | 248/1 |
| 3,301,609 | 1/1967 | Palfreyman | 308/3 R |

FOREIGN PATENTS OR APPLICATIONS
82,091   0/1934   Switzerland............... 52/396

Primary Examiner—Charles J. Myhre
Assistant Examiner—R. H. Lazarus
Attorney, Agent, or Firm—Dwight H. Smiley; Imirie & Smiley

[57] ABSTRACT

A sliding and deformable bearing for insertion between building components liable to limited respective movement or creep, consisting of a flattened tube with loops at the ends of the flat part as seen in cross-section, means within the tube to facilitate relative sliding movement between the inner faces of the tube, and a flat deformable thickening of one wall of the tube to function as a bearing body. The dimensions of the parts are such that initial movement between the components is accommodated by sliding movement, and final limited movement, when one of the loops has been reduced in size, by deformation of the bearing body.

8 Claims, 6 Drawing Figures

PATENTED FEB 26 1974 3,794,390

INVENTOR
FREDY KILCHER BY

*Emicie & Smiley*
ATTYS.

SLIDING AND DEFORMABLE BEARING FOR INSERTION BETWEEN BUILDING COMPONENTS

BACKGROUND OF THE INVENTION

Combined slide and deformation bearings are generally designed on the assumption that the sliding capacity is to be maintained throughout life. Deformable bearing bodies are used more particularly for taking up or compensating for differences in angular positions between the surfaces of components between which the bearings are located, such as might be due to the sagging of a ceiling. To ensure permanent sliding capacity of bearings has hitherto necessitated a relatively complicated and expensive design. In any case, slide bearings should have a low friction co-efficient and a high resistance to wear, and remain permanently regular and smooth. Lubricants cannot ensure a permanent and satisfactory sliding effect.

The most recent research reveals, however, that comparatively large transverse displacements occur (0.5 – 0.7 mm per metre) between the components which can in practice only be catered for by a slide bearing. The displacements occur mainly in new buildings as a result of the considerable difference, particularly in cold weather, between the concrete setting temperature and the lowest temperature, and also due to shrinking of a part, such as a ceiling, formed from concrete in situ. Subsequent displacements (± 0.1 mm per metre) arising from minor temperature fluctuations, are of an order of magnitude which can be compensated by a deformable bearing.

Unlimited easy sliding of bearings in building construction is usually undesirable and dangerous. It is preferably desirable to endeavour to obtain limitation of the sliding movement of the bearing so that the supporting part of the construction cannot become laterally deflected to any appreciable extent, but is secured by the supported part of the construction.

SUMMARY OF THE INVENTION

According to the present invention there is provided a sliding and deformable bearing for location between building components, comprising a deformable bearing body with surfaces capable of sliding over each other when loaded, the sliding surfaces being the inner faces of a flattened tube of elastically deformable material, the side wall members of the tube forming a displaceable loop at least on one side of the bearing body, wherein the inner side of the tube wall opposed to the bearing body and of the loop, forms a continuous sliding surface for the bearing body, the deformability of the loop limiting the sliding path transversely to the axis of the tube and thus acting as a stop. If the sliding characteristics should subsequently deteriorate or disappear altogether, the deformability of the bearing body is sufficient to accommodate the relative movement between the components then occurring under normal circumstances. The free sliding movement, however, is limited from the start, and thus prevents excessive deflection of the supported components, an action which could result in cracks or destruction. A supporting component such as a wall, is therefore secured to a certain extent between elastic buffers, due to the limitation of the sliding path of the bearing.

The bearing may be constructed in one piece, at least one deformable bearing body being formed in the wall of the tube, the inner surface of which is in contact as a sliding surface with the opposing inner surface of the tube. In this case a lubricant can be introduced into the inner space of the tube, since a material such as neoprene, if used for the tube, has no satisfactory sliding properties.

The manufacture of the last mentioned bearing may be carried out according to an aspect of the present invention, in that the lubricant is injected into the tube during extrusion thereof. The bearing is therefore ready made for use as it comes from the manufacturer, and can be immediately placed in position, if desired, combined with other parts to form a unit. The bearing can also be used in individual, plate-like sections.

DETAILED DESCRIPTION OF THE INVENTION

Figure 1:
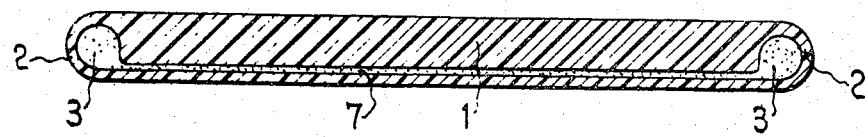
FIG. 1 is an embodiment of a bearing in cross-section.

The combined sliding and deformable bearing of FIG. 1 is formed as a closed tube of elastic material such as neoprene. One wall of the flat flexible tube is thickened to form an elastically deformable bearing body 1. The other thinner part of the wall forms loops 2 externally of the bearing body 1 and then extends flat under the bearing body. The loops 2 each enclose a hollow space 3. The tube is filled with a suitable lubricant which is compatible with the material of the tube, e.g., a silicone oil solution or emulsion. The cavities 3 serve as a reservoir, and a lubricant film 7 is also provided between the superimposed surfaces of the bearing body 1 and the opposing tube wall.

When the bearing is disposed between components, it acts at least initially as a slide bearing, particularly during any initial cooling and shrinking of a component poured from concrete in situ, the bearing body 1 sliding with very little friction on the opposing wall of the tube. The loops 2 are first elastically deformed without producing any serious resistance. However if one loop slides under the bearing body by continuous displacement of the bearing body until it is tensioned, it exerts considerable resistance against any further displacement. The bearing therefore acts as though it had end stops which are not absolutely rigid but which, after a certain sliding movement, offer a considerable increase in resistance against further displacement and thus prevents uncontrolled deflection of the supporting component.

Subsequently, only insignificant displacements take place due to normal climatic influences. Initially, sliding may also take place. However, the bearing body 1 is designed so that, if the lubricant should fail, it can accommodate all normal displacements by elastic deformation.

Figure 2:
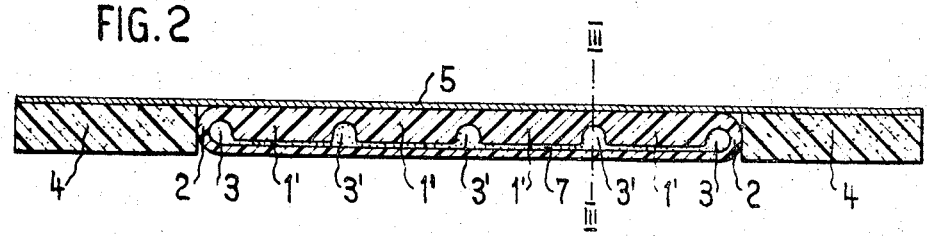
FIG. 2 is a cross-section through another embodiment of the bearing, combined with fillers.

FIG. 2 shows a similar bearing which differs from that of FIG. 1 only by the feature that the bearing body is divided into several individual strips 1', between which cavities 3' are located. The bearing is pasted on a support 5, e.g., of paper or plastics material, with lateral fillers 4 of a material of poor bearing capacity. These fillers are used to cover the parts of the surface at the sides of the actual bearing when the bearing is applied to a bearing surface of the construction, and prevent direct connection between the bearing part and an upper part formed from concrete on the spot. In this case the bearing with the fillers is preferably formed as a continuous strip which can be placed on a supporting wall.

Figure 3:
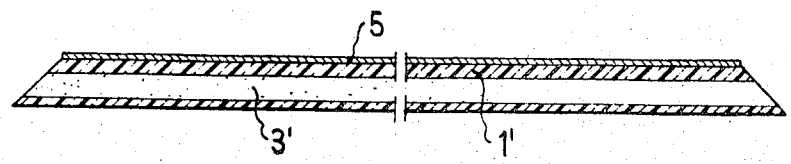
FIG. 3 is a section taken on the line III—III of FIG. 2.

FIG. 3 is a longitudinal section through a bearing according to FIG. 2. The ends of the tube are, as shown in FIG. 3, cut obliquely so that the bearing bodies 1 and 1' are set back relatively to the edges of the lower side of the tube. Even if, due to elastic deformation or longitudinal displacement of the bearing body, its terminal edges finally extend somewhat beyond the lower side of the tube, pressure takes place in any case in the region of the superimposed sliding surfaces of the bearing bodies or the opposite side of the tube, and not in the region of the terminal edge of the bearing body or the opposite wall of the tube where excess local pressures and, consequently, damage may occur. The ends of the tube may be sealed in order to prevent lubricant flowing out and impurities entering.

Figure 4:
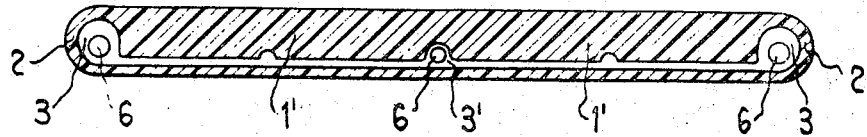
FIGS. 4 – 6 are sections through other embodiments.

FIG. 4 shows a section through another embodiment having two bearing bodies 1'. This figure shows lubricant being injected into the cavities 3 and 3' of the profile just issuing from the nozzle of an injection or extrusion machine, from nozzles 6. The lubricant also flows between the opposing inner surfaces of the tube. The bearing is thus constructed in one operation.

Figure 5:
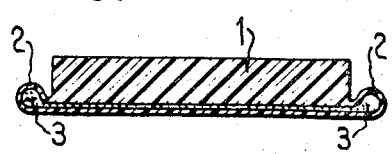

The bearing body need not, as assumed in the previous embodiments, be disposed on the inside of the tube. The thickening of the tube forming the bearing body 1 may also extend outwardly, as shown in FIG. 5, the loops 2 having a somewhat flatter form but fulfilling the same function as that described with reference to FIG. 1. The loops may also project at each end.

Figure 6:
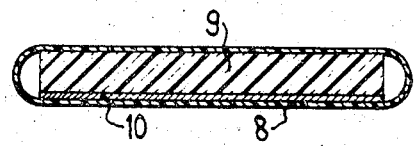

Again, the bearing need not, as hitherto assumed, be made as one part. For example, according to FIG. 6, a prefabricated tube 8 of suitable material such as neoprene, is connected to a bearing body 9 which is coated on the sliding surface with an efficiently sliding layer 10 of P.T.F.E., or a metal plate. In this case lubricant may be dispensed with. This embodiment is more suitable for shorter bearing sections, since the incorporation of a special bearing body in a long tube would be complicated. In the embodiment of FIG. 6, the bearing body need not be firmly connected to the tube, but could also be inserted loosely, if desired. Since the friction co-efficient of friction between the tube and the uncoated bearing body on the upper side thereof is higher than that between the layer 10 and the tube, in this case also the desired function of the bearing is ensured.

A combination of tube and bearing body would also be possible in an embodiment similar to that of FIG. 5, in which the bearing body is cemented to the outside of the tube. It would even be possible for the bearing body to be located loosely on the outside of the tube provided that the inner faces of the tube were lubricated to slide more readily than the bearing body on the outside of the tube.

All the various embodiments comprising a separate bearing body and tube have the advantage that they can be made of available manufactured items, i.e. a tube and a strip, and require no special injection tools. They are therefore particularly suitable for manufacturing in small quantities for special purposes.

In all the embodiments, the tube and/or the bearing body may be reinforced.

Instead of a liquid lubricant, a material may be injected into the tube which solidifies to form a firm sliding layer or sliding body.

In the unloaded bearing ready for fitting, the bearing body usually lies symmetrically in the tube so that both ends 2 have the same dimensions, as shown in all the figures. Fitting may then be effected without paying attention to any definite positioning. However, in certain cases, where a very large initial displacement in a known direction is expected, an asymmetrical bearing can also be fitted in which the bearing body initially lies asymmetrically and then, after the initial displacement, becomes substantially symmetric in the tube.

The embodiments of the invention in which an exclusive property or privilege is claimed are defined as follows:

1. A slidable and deformable bearing for location between building structural components, comprising a flattened flexible tube including parallel flattened walls joined at opposite sides by integral curved walls, friction reducing means interiorly of said tube, said curved walls having high resistance characteristics when subjected to tension, at least the outer surface of one said flattened tube wall constituting a bearing surface, said one flattened tube wall supporting a flat deformable load bearing body substantially coextensive with the other flattened wall of said tube, the inner flattened surfaces of said bearing being relatively slidable, said curved wall portions of said tube defining movable loops beyond the respective sides of said bearing body to permit movement between said inner surfaces by low resistance sliding therebetween to the limit imposed by the length of said loops and by high resistance deformation of said bearing body upon movement beyond the limit imposed by the length of said loops.

2. A bearing as recited in claim 1 wherein said tube and bearing body are of unit construction.

3. A bearing as recited in claim 1 wherein said bearing body is provided interiorly of said tube, one face of said body being in sliding contact with one opposed face of said tube.

4. A bearing as recited in claim 1 wherein said body is formed as an interior thickening of one wall of said tube, said body defining cavities as the sides thereof.

5. A bearing as recited in claim 1, having ends cut obliquely to one surface of said tube.

6. A bearing as recited in claim 1, wherein said bearing body and said tube are separate parts which are fastened together during manufacture of said bearing.

7. A bearing as recited in claim 1 including a layer of low-coefficient of friction material on one inner face of said tube.

8. A bearing as recited in claim 1, comprising a filling of lubricating material within said flattened tube.

* * * * *